United States Patent
Amels et al.

(10) Patent No.: US 6,703,818 B2
(45) Date of Patent: Mar. 9, 2004

(54) AC TO AC POWER CONVERTER FOR ELECTRONIC DEVICES HAVING SUBSTANTIALLY DIFFERENT OUTPUT VOLTAGE/CURRENT CHARACTERISTICS

(75) Inventors: David Anthony Amels, Woodridge, NJ (US); George A. DeLellis, III, Bloomfield, PA (US); David F. Witt, Shamokin, PA (US); Edward J. Linkus, Jr., Paxinos, PA (US)

(73) Assignee: D/E Associates, Inc., Shamokin, PA (US)

( * ) Notice: Subject to any disclaimer, the term of this patent is extended or adjusted under 35 U.S.C. 154(b) by 0 days.

(21) Appl. No.: 10/027,528

(22) Filed: Dec. 26, 2001

(65) Prior Publication Data

US 2003/0117821 A1 Jun. 26, 2003

(51) Int. Cl.[7] ............................................. H02M 5/257
(52) U.S. Cl. ........................................ 323/320; 363/124
(58) Field of Search .............................. 323/237, 320; 363/124

(56) References Cited

U.S. PATENT DOCUMENTS

| | | |
|---|---|---|
| 4,314,327 A | 2/1982 | DePuy |
| 4,626,981 A | 12/1986 | Su et al. |
| 5,448,467 A | 9/1995 | Ferreira |
| 5,459,338 A | 10/1995 | Takayanagi et al. |
| 5,550,440 A * | 8/1996 | Allison et al. |
| 5,654,884 A | 8/1997 | Mohan |
| 5,805,439 A | 9/1998 | Kruppa |
| 5,847,942 A | 12/1998 | Bazinet et al. |
| 5,943,200 A | 8/1999 | He |
| 5,949,671 A | 9/1999 | Lee et al. |
| 6,005,303 A | 12/1999 | Hawkes et al. |
| 6,008,589 A | 12/1999 | Deng et al. |
| 6,034,413 A | 3/2000 | Hastings et al. |
| 6,122,182 A | 9/2000 | Moisin |
| 6,134,122 A | 10/2000 | Chen et al. |
| 6,154,014 A | 11/2000 | Suu |
| 6,172,489 B1 | 1/2001 | Walker |
| 6,208,122 B1 * | 3/2001 | Yuan ........................... 323/237 |
| 6,236,192 B1 * | 5/2001 | Suzuki et al. ................ 323/239 |
| 6,268,758 B1 | 7/2001 | Limmer et al. |

* cited by examiner

Primary Examiner—Jeffrey Sterrett
(74) Attorney, Agent, or Firm—Caesar, Rivise, Bernstein, Cohen & Pokotilow, Ltd.

(57) ABSTRACT

A method for performing power conversion provides a converter output AC waveform from a converter input AC waveform, the convertor input waveform having an input power level, an input frequency, an input waveform shape, and an input voltage/current characteristic. The converter input AC waveform is applied to a converter switch with a switch frequency and the switch is operated at the switch frequency to provide a switched waveform having a plurality of switched waveform notches with a notch repetition rate substantially equal to the switch frequency. A filter performs filtering of the switched waveform to provide the converter output AC waveform with an output power level substantially equal to the input power level, an output frequency substantially equal to the input frequency, an output waveform shape substantially similar to the input wave form shape, and an output voltage/current characteristic substantially different from the input voltage/current characteristic.

13 Claims, 3 Drawing Sheets

AC TO AC POWER CONVERTER FOR ELECTRONIC DEVICES HAVING SUBSTANTIALLY DIFFERENT OUTPUT VOLTAGE/CURRENT CHARACTERISTICS

FIELD OF THE INVENTION

The invention relates to the field of power conversion and in particular to the field of alternating current power conversion.

BACKGROUND OF THE INVENTION

It is well known to provide power converters for converting electrical power from one form into a different form that is useable under many specific circumstances for powering electrical load devices. For example, it is known to provide a direct current (DC) power supply that converts alternating current (AC) power into DC power for supplying DC electrical power to mobile devices.

Additionally, it is known to provide an AC/DC power conversion device which is adapted to perform the power conversion in accordance with the power sources available in different countries. Another well known type of power conversion is the AC/DC type of conversion that is performed by light dimmers, wherein the peak-to-peak voltage of the output is maintained substantially the same as the peak-to-peak voltage of the input while the power conversion is accomplished by changing the duty cycle of the output.

Commercial power in Europe is supplied at 220 VAC with a frequency of 50 Hertz (Hz). In the United States the standard voltage supplied is 120 VAC at 60 Hz. In addition, brownouts may significantly reduce a line voltage below the standard level and, conversely, lighter loads, particularly at night, may cause the line voltage to increase above the standard level. Additionally, corresponding variations in frequency are possible. Accordingly, power converters operating on the standard power suppliers to provide a DC source are typically designed to operate at frequencies between 47 and 65 Hz and with voltages ranging from 85 VAC to 265 VAC.

Typically such a DC power supply converts an AC input voltage to a DC output voltage using an electromagnetic interference filter, a power factor correction circuit and a DC to DC converter. The electromagnetic interference filter is used in order to insure compliance with applicable electromagnetic interference standards. The power factor correction circuit converts AC power to a high DC voltage. For example, the high DC voltage can be 400 VDC. The DC to DC converter scales the high DC voltage down to a lower DC voltage as required by the load equipment to be powered by the power supply.

U.S. Pat. No. 5,949,671, issued to Lee on Sep. 7, 1999 and entitled "Power Supply With Re-Configurable Outputs For Different Output Voltages and Methods Of Operation Thereof" teaches a type of DC power supply that is well known in the prior art. The DC power supply taught by Lee has a pair of output rectifying circuits that are coupled in alternate configurations to provide dual voltages at an output of the DC power supply. The voltage supply taught by Lee is thus capable of providing different output voltages using a single voltage controller.

U.S. Pat. No. 4,626,981, issued to Su on Dec. 2, 1986 teaches a dual voltage converter circuit. The dual voltage converter circuit taught by Su converts an AC input voltage into an AC output voltage having a predetermined amplitude. The output voltage is coupled to a load circuit in order to energize the load circuit. When a relatively low amplitude AC mains supply voltage is applied to the converter the entire AC mains supply voltage is selectively coupled to a degaussing circuit without substantial amplitude change. On the other hand, when a relatively high amplitude AC mains supply voltage is provided a portion of the amplitude of the input AC mains supply voltage having an amplitude that approximates that of a lower AC mains supply voltages is coupled to the degaussing circuit.

Su also teaches coupling an AC input voltage to a rectifier arrangement of a voltage converter to develop DC voltages in a pair of capacitors. The rectifier arrangement combines the AC input voltage with the voltages in the first and second capacitors, respectively, to produce an output voltage. The output voltage energizes an AC utilization circuit such as a degaussing circuit.

During the positive portion of each cycle of the AC input voltage, the rectifier arrangement couples a positive difference voltage to the degaussing circuit. The positive difference voltage is formed between the positive portion of the AC input voltage and the voltage in the first capacitor to produce a positive level of the degaussing voltage. During the negative portion of each cycle of the AC input voltage, the rectifier couples a negative difference voltage to the degaussing circuit. The negative difference voltage is formed between the negative portion of the AC input voltage and the voltage in the second capacitor to produce a negative level of the degaussing voltage.

However, the power converters taught by Lee and Su are suitable only for resistive loads. They are not suitable for powering devices having electronic loads primarily because of voltage spikes and other signal distortions present in the output voltage signals of these converters. For example, a 120 volt rms signal at the output of a converter such as the one taught by Su may have peaks approaching those of a 240 volt signal. Such peaks can destroy electronic circuitry.

U.S. Pat. No. 4,314,327, issued to DePuy on Feb. 2, 1982, entitled "Transistor Drive Control For A Multiple Input DC To DC Converter" is an example of another type of prior art electrical energy conversion circuit. The conversion circuit taught by DePuy operates with major and minor variations in the level of applied input DC voltage and reduces the computational losses of its switching transistors that may other occur for the major and minor increases of the input DC voltage.

A base drive current circuit in the DuPuy converter includes a full wave rectifier and multiple level current limiting circuit which is interposed between a base drive winding of a saturable transformer and the base electrodes of the transistors of first and second transistor diode combinations. The base drive current circuit adapts the saturation condition of the first and second transistor diode combinations to the level of the applied DC input voltages. This reduces the level of increase of the computational losses of the transistor diode combinations.

Kruppa, in U.S. Pat. No. 5,805,439 issued on Sep. 8, 1998, teaches a DC to DC automatic switching circuit. The Kruppa device is a circuit for controlling multiple DC input voltages to produce a predetermined output voltage using a single DC to DC converter. Sensing of the DC input voltages supplied to the Kruppa switching device permits automatic switching in order to route an applied voltage between input terminals and output terminals. Furthermore, this switching permits configuring of a feedback network that selects the output voltage of the DC to DC converter.

U.S. Pat. No. 5,654,884, entitled "Multistand AC/DC Converter With Baseline Crossing Detection" issued to Mohan on Aug. 5, 1997 provides circuitry for use in an integrated circuit controlled voltage doubler/bridge circuit. This circuitry is adapted to detect a period during which there is a lack of AC supply voltage following a period of AC input voltage within a predetermined range of values. When this occurs repeated triac firing pulses are provided such that the AC supply is rectified and doubled as soon as the AC supply voltage returns.

Thus, it is known in the prior art to provide AC to AC converters which are not suitable for use with electronic devices. It is also known to provide converters which supply DC electrical energy suitable for use with electronic devices from an AC or a DC input. However, none of these devices are capable of providing AC/DC energy conversion suitable for use with electronic devices. It is known to solve these problems using a transformer. However, the use of a transformer increases the size, weight and cost of a power conversion device.

SUMMARY OF THE INVENTION

A method for performing power conversion in a power converter device provides a converter output AC waveform from a converter input AC waveform, the convertor input waveform having an input power level, an input frequency, an input waveform shape, and an input voltage/current characteristic. The converter input AC waveform is applied to a converter switch having a converter switch frequency and the switch is operated at the converter switch frequency to provide a switched waveform, the switched waveform having a plurality of switched waveform notches with a notch repetition rate substantially equal to the converter switch frequency. A filter performs filtering of the switched waveform to provide the converter output AC waveform having an output power level substantially equal to the input power level, an output frequency substantially equal to the input frequency, an output waveform shape substantially similar to the input wave form shape, and an output voltage/current characteristic substantially different from the input voltage/current characteristic.

The output voltage/current characteristic has an output voltage level substantially less than an input voltage level of the input voltage/current characteristic and an output current level substantially higher than an input current level of the input voltage/current characteristic. The converter input AC waveform has a positive half cycle and a negative half cycle and the switched waveform notches are formed during both the positive half cycle and the negative half cycle of the converter input AC waveform. The input waveform shape can be a sine wave and the output waveform shape can be a sine wave. Additionally, the input waveform shape can be a square wave and the output waveform shape can be a square wave.

The converter switch frequency is substantially higher than the input frequency and the filtering is performed by a filter having a filter a corner frequency that is at least twice as high as the input frequency. The converter switch frequency is substantially higher than the filter corner frequency. The filter has a frequency spectrum including a snitching component of the converter switch wherein the attenuation of the switching component by the filter is determined in accordance with the relationship: Attenuation in dB=12*log2($F_{sw}$2$F_{in}$) and $F_{sw}$ represents the converter switch frequency and 2Fin represents the filter corner frequency.

DETAILED DESCRIPTION OF THE PREFERRED EMBODIMENT

Figure 1:
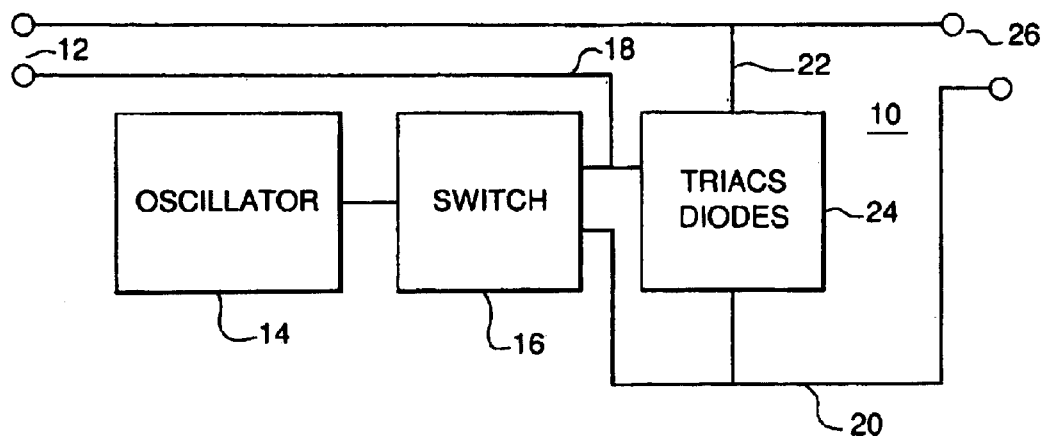
FIG. 1 is a block diagram representation of the electronic power converter device of the present invention.

Referring now to FIG. 1, there is shown electronic power converter 10 of the present invention. During operation of electronic power converter 10, an input AC waveform is applied to converter input port 12 which is defined by interconnect lines 18, 22. An output AC waveform is provided at converter output port 26 of electronic power converter 10. Converter output port 26 is defined by interconnect lines 20, 22. Thus, interconnect line 22 is common to converter input port 12 and converter output port 26.

The signal of common interconnect line 22 is applied to triacs/diodes block 24. Input interconnect line 18 is also applied to triacs/diodes block 24. Additionally, input interconnect line 18 is coupled to an output of waveform chopping switch 16 in order to permit power conversion of an input AC waveform applied to converter input port 12 in accordance with the method of the invention.

In order to perform conversion of an input AC waveform of converter input port 12 a plurality of triacs and diodes is provided within triacs/diodes block 24. The triacs and diodes within triacs/diodes block 24 are adapted to switch into an off state under the control of waveform chopping switch 16 and to prevent signals from being applied to converter outport port 26 during portions of both the positive going cycles and the negative going cycles of the input AC waveform. This results in power conversion of an input AC signal while still providing an output signal having substantially the same frequency as the input which is suitable for application to a load device having electronic components therein.

Figure 2:
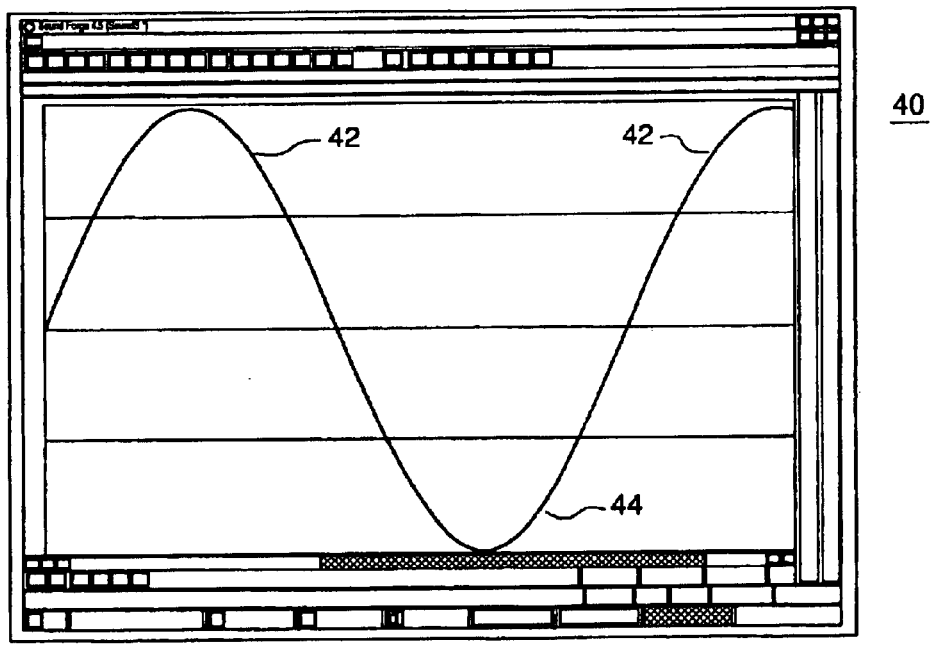
FIG. 2 is a graphical representation of an input waveform which can be applied to the input of the electronic power converter device of FIG. 1.
Figure 3:
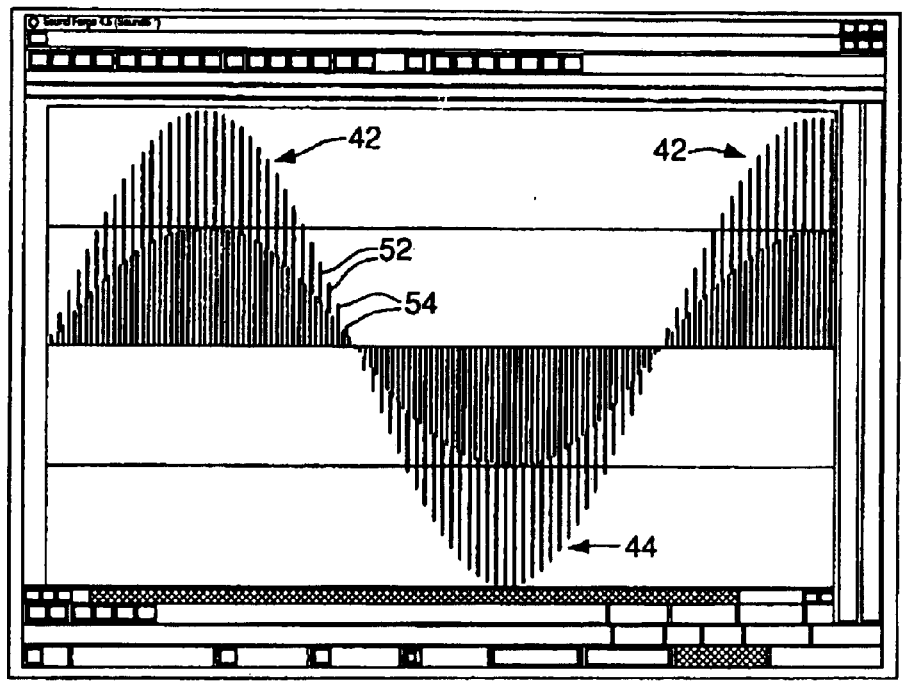
FIG. 3 is a graphical representation of the operation of a switching circuit provided within the electronic power converter device of FIG. 1.
Figure 4:
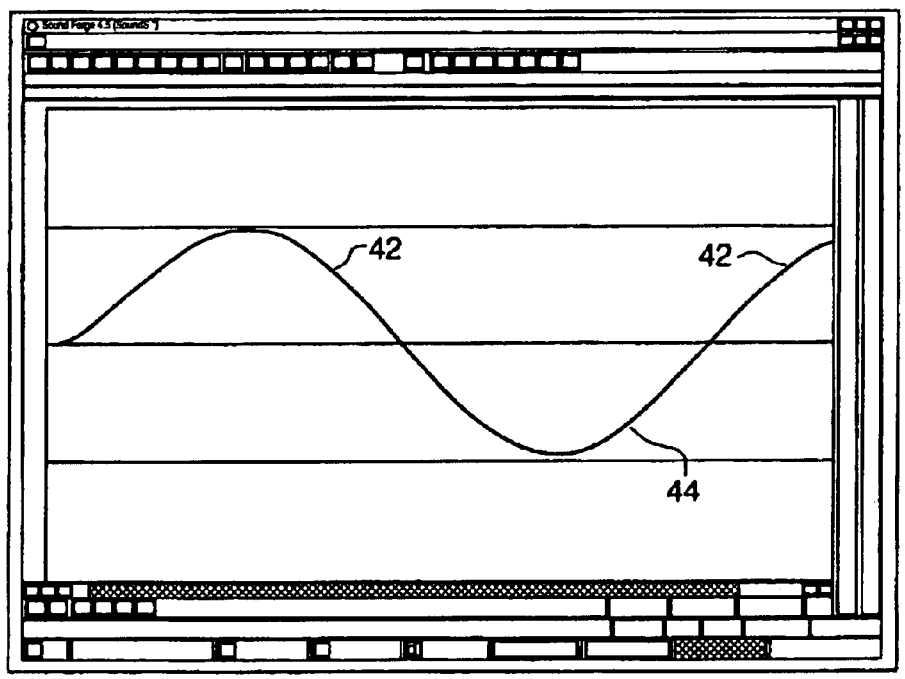
FIG. 4 is a graphical representation of an output waveform that can appear at the output of the electronic power converter device of FIG. 1.

Referring now to FIGS. 2, 3, 4, there are shown input power waveform 40, intermediate power waveform 50, and converted output power waveform 60, respectively. Each of the power waveforms 40, 50, 60 has a positive half cycle 42 and a negative half cycle 44. The frequency, shape, power and phase of output power waveform 60 substantially follows those of input power waveform 40, allowing for minor differences. The minor differences can be due to factors such as loss, noise and artifacts that may be introduced by electronic power converter 10.

Input power waveform 40 is applied to converter input port 12 for conversion by electronic power converter 10 of the present invention. Intermediate power waveform 50 is then created within triacs/diodes block 24 of electronic power converter 10 in accordance with waveform chopping switch 16 as part of the power conversion process of the present invention. Converted output power waveform 60 is the output AC waveform of electronic power converter 10 which is provided at converter outport port 26.

In order to convert input power waveform 40 into output power waveform 60, a plurality of notches is formed in the input power waveform 40 during both the positive half cycles 42 and the negative half cycles 44 by the triacs and diodes of triacs/diodes block 24. This results in the formation of waveform notches 52 and corresponding waveform peaks 54 shown in intermediate power waveform 50. The manner in which the waveform notches 52 and waveform peaks 54 are formed by the triacs and diodes within triacs/diodes block 24 under the control of waveform chopping switch 16 as described in more detail below.

Waveform chopping switch 16 in the preferred embodiment of the invention is a two pole low pass switch. Using waveform chopping switch 16 the waveform notches 52 are formed when waveform chopping switch 16 is in a first switch position and the waveform peaks 54 are formed when waveform chopping switch 16 is in a second switch position.

Operation of waveform chopping switch 16 is controlled by switch control oscillator 14. Switch control oscillator 14 can be adapted to have a switching frequency substantially higher than the frequency of input power waveform 40 in order to provide a suitable output power waveform 60. For example, for a 60 Hz input power waveform 40, the frequency of switch control oscillator 14 can be about 5 Kz. Intermediate power waveform 50 is filtered within electronic power converter 10 in order to provide the output power waveform 60.

While input power waveform 40 is shown as a sine wave, it will be understood that the method of the present invention can be applied to input and output waveforms of any shape. For example, if input power waveform 40 is a square wave, a step function or any other sinusoid, the shape of output power waveform 60 is the same as the shape of input power waveform 40, i.e. a square wave, a step function or other sinusoid, respectively.

Figure 5:
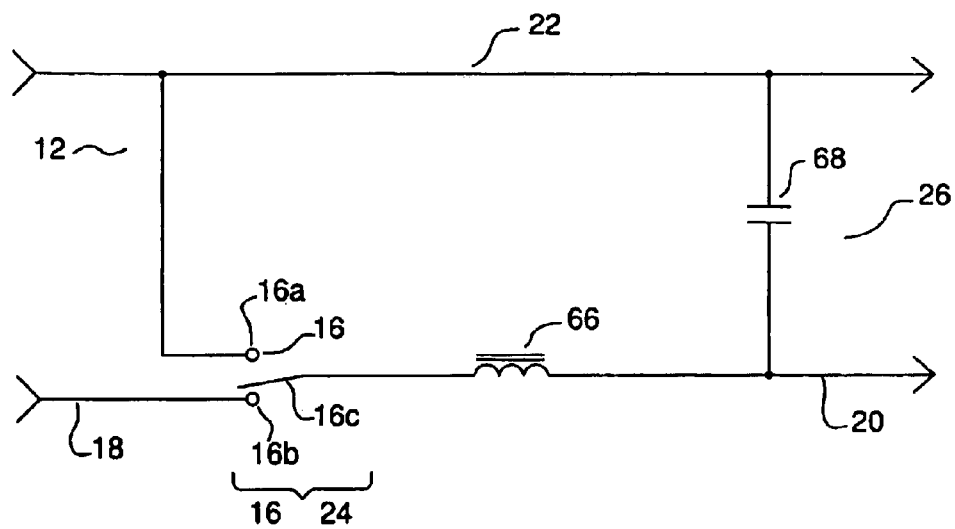
FIG. 5 is a schematic representation of the circuitry of the electronic power converter device of FIG. 1.

Referring now to FIG. 5, there is shown a high level schematic representation of the electronic power converter 10 of the present invention. In the high level schematic representation of electronic power converter 10, the input interconnect lines 22, 18, defining the converter input port 12, are coupled, respectively to switch terminals 16a, b of waveform chopping switch 16.

When waveform chopping switch 16 is in a first switch position input interconnect line 18 and switch terminal 16b are electrically coupled to contact 16c of waveform chopping switch 16. In this first position of chopping switch 16, input power waveform 40 is applied to converter outport port 26 by way of filter inductor 66 which removes the sum and difference products caused by chopping switch 16 in cooperation with output capacitor 68. The signal at the output of filter inductor 66 is coupled to converter outport port 26 by way of interconnect line 20. This position of chopping switch 16 corresponds to the waveform peaks 54 of the intermediate power waveform 50.

When waveform chopping switch 16 is in a second position, input interconnect line 22 of converter input port 12 is applied directly to filter inductor 66. In this manner, the signal applied to output capacitor e by way of filter inductor 66 is substantially the same as the signal applied to the opposite end of output capacitor 68 by way of interconnect line 22, thereby creating waveform notches 52 in intermediate power waveform 50.

Thus, it will be understood that the series of repeating waveform notches 52 and waveform peaks 54 of intermediate power waveform 50 are provided within electronic power converter 10 of the present invention as waveform chopping switch 16 is repeatedly thrown from one position of the first and second positions to the other. Furthermore, it will be understood that the unused power of the power conversion process of the present invention is reflected back to the power source that provides input power waveform 40.

The output filter formed by filter inductor 66 and output capacitor 68 can have a corner frequency of about 120 Hz depending on the permitted ripple of output power waveform 60 and the switching frequency of switch control oscillator 14. The output filter of electronic power converter 10 must therefore be effective to remove the oscillator frequency and harmonics from output power waveform 60.

Broadly, one of the purposes of the output filter is to reduce the switching component of the power spectrum of output power waveform 60 to an acceptable level. In order to perform this function, the output filter formed by filter inductor 66 and output capacitor 68 is preferably a two pole lowpass filter with a typical roll off characteristic of approximately −12 dB per octave at frequencies above the filter corner frequency. The relationship of the filter corner frequency of electronic power converter 10 is given by $1/(2*PI*SQRT(LC))$ where L is the inductance of filter inductor 66 and C is the capacitance of output capacitor 68.

If the corner frequency of the output filter is chosen to be sufficiently above the input frequency of input power waveform 40 there is negligible power loss in electronic power converter 10. Such substantially low power loss is necessary to provide substantially the same power for power waveforms 40, 60. In order to meet this specification a good approximation of the output corner frequency can be to limit it to a value higher than an octave above the highest harmonic of interest in input power waveform 40.

The relationship of the switching frequency of waveform chopping switch 16 to the frequency of input power waveform 40 should be one in which the switching frequency is sufficiently higher than the frequency of input power waveform 40 so as to provide sufficient attenuation of the switching component in the spectrum by the output filter while not providing substantial attenuation of input power waveform 40. It the input frequency, $F_{in}$, is a sinusoid and the corner frequency of the output filter is chosen to be $2F_{in}$, the relationship between the switching frequency and the amount of attenuation of switching component in the spectrum of the output signal is as follows: Attenuation in dB=$12*\log2(F_{sw}/2F_{in})$, where $F_{sw}$ is the switching frequency and $2F_{in}$ is twice the corner frequency of the output filter.

Intermediate power waveform 50, formed in this manner, appears at the input of waveform chopping switch 16. Intermediate power waveform 50 appears between chopping switch 16 and filter inductor 66. Output power waveform 60 appears at the output of filter inductor 66. It will be understood by those skilled in the art that electronic power converter 10 thus performs the AC/AC power conversion of the present invention independently of any AC/DC conversion and independently of any DC/DC or DC/AC power conversions.

Figure 6:
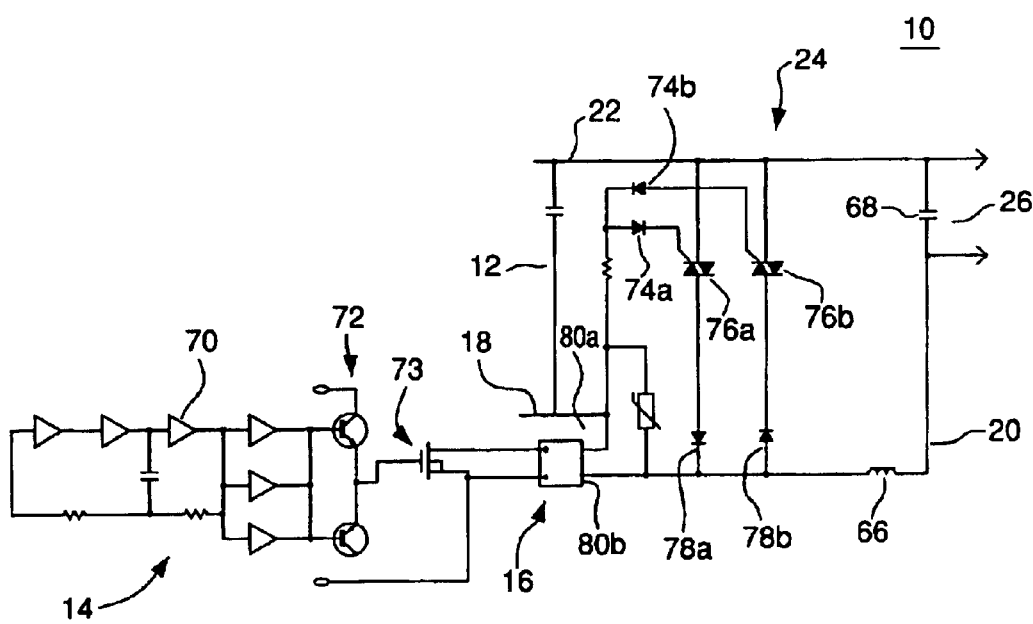
FIG. 6 is a more detailed schematic representation of the circuitry of the electronic power converter device of FIG. 1.

Referring now to FIG. 6, there is shown a more detailed schematic representation of power converter device 10 of the present invention, including a more detailed representation of switch control oscillator 14. Switch control oscillator 14 can be a conventional feedback operational amplifier oscillator circuit 70. As previously described the oscillation frequency of feedback operational amplifier circuit 70 should be substantially higher than the frequency of input power waveform 40.

The output of operational amplifier oscillator 70 is driven by drive transistors 72 and drive MOSFET 73 prior to being applied to waveform chopping switch 16 in order to permit operational amplifier oscillator circuit 70 to control the switching of chopping switch 16. It will be understood that chopping switch 16 in the preferred embodiment of the invention may be energized by a DC voltage, although no DC conversion is involved in performing its operations. In this manner input power waveform 40 and the oscillator frequency of oscillator circuit 70 are multiplied by each other. It will be understood by those skilled in the art that chopping switch 16 can be triggered at any phase within the input power waveform 40 since the triggering of chopping switch 16 is not synchronized with any line voltage or any other reference signal.

In the preferred embodiment of the invention, the duty cycle of the output signal of oscillator circuit 70 can be approximately fifty percent. However, it will be understood by those skilled in the art that the duty cycle of the output signals of oscillator circuit 70 is determined by the power division factor required between input power waveform 40 and output power waveform 60.

Output terminal 80a of waveform chopping switch 16 is applied to the gates of two triacs 76a,b within triacs/diodes block 24 byway of respective diodes 74a,b. Diodes 74a,b are coupled to output terminal 80a of chopping switch 16 with opposite pluralities. Thus, during one-half cycle of input power waveform 40 the gate of triac 76a is triggered by diode 74a and during the other half-cycle triac 76a is in a conducting state.

In this manner the input of filter inductor 66 is alternately connected to either input interconnect line 18 or input interconnect line 22 of converter input port 12 to alternately form the waveform notches 52 and the waveform peaks 54 of intermediate power waveform 50 as previously described. The signals of triacs 76a,b are applied to filter inductor 66 by way of clamping diodes 78a,b. Clamping diodes 78a,b provide return current paths for filter inductor 66 when triacs 76a,b are alternately conducting.

Thus, the frequency, the waveform shape and the power of output power waveform 60 are substantially the same as the frequency, the waveform shape, and the power of input power waveform 40 while, simultaneously, the voltage/current characteristics of power waveforms 40, 60 can differ substantially. The differences in voltage/current characteristics between power waveforms 40, 60 can be controlled in accordance with the duty cycle of switch control oscillator 14 and, thereby, the duty cycle of waveform notches 52 and waveform peaks 54 within intermediate power waveform 50.

An example of such a power conversion wherein voltage and current are converted but the frequency, waveform shape, and power are not converted can be as follows. The voltage/current characteristics of input power waveform 40 can be, for example, 100 watts input at 100 volts and 1 amp. The 100 watt input power waveform 40 can be converted into an output power waveform 60 of approximately 100 watts at 50 volts and 2 amps. Thus, the conversion performed by electronic power converter 10 is in accordance with Watt's Law, wherein the decrease in voltage level is accompanied by a corresponding proportional increase in the current level. The conversion of power without conversion of frequency, waveform shape or power is similar to the conversion performed by a conventional step down transformer or by an impedance transformation.

Without further elaboration, the foregoing will so fully illustrate my invention that others may, by applying current or future knowledge adopt the same for use under various conditions of service.

We claim:

1. A method for performing power conversion in a transformerless power converter device to provide a converter output AC waveform from a converter input AC waveform, said input waveform having an input power level, an input frequency, an input waveform shape, and an input voltage/current characteristic, comprising the steps of:
   (a) applying said converter input AC waveform to a converter switch having a converter switch frequency;
   (b) operating said converter switch at said converter switch frequency to provide a switched waveform, said switched waveform having a plurality of switched waveform notches with a notch repetition rate substantially equal to said converter switch frequency; and
   (c) filtering said switched waveform to provide said converter output AC waveform having: (1) a an output power level substantially equal to said input power level; (2) an output frequency substantially equal to said input frequency; (3) an output waveform shape substantially similar to said input waveform shape; and (4) an output voltage/current characteristic substantially different from said input voltage/current characteristic whereby the relative input/output power levels, frequencies, waveform shapes and voltage/current characteristics are provided without the use of a transformer.

2. The method for performing power conversion of claim 1, wherein said output voltage/current characteristic comprises an output voltage level substantially less than an input voltage level of said input voltage/current characteristic and an output current level substantially higher than an input current level of said input voltage/current characteristic.

3. The method for performing power conversion of claim 1, wherein said converter input AC waveform has a positive half cycle and a negative half cycle comprising the further step of providing said switched waveform notches during both said positive half cycle and said negative half cycle of said converter input AC waveform.

4. The method for performing power conversion of claim 1, wherein said input waveform shape comprises a sine wave and said output waveform shape comprises a sine wave.

5. The method for performing power conversion of claim 1, comprising the further steps of:
   (a) applying said converter output AC waveform to a power converter load having power converter load electronics therein, and
   (b) powering said power converter load electronics using said converter output AC waveform.

6. The method for performing power conversion of claim 1, wherein said converter switch frequency is substantially higher than said input frequency.

7. The method for performing power conversion of claim 6, wherein said filtering is performed by a filter having a filter corner frequency and said filter corner frequency is at least twice as high as said input frequency.

8. The method for performing power conversion of claim 7, wherein said converter switch frequency is substantially higher than said filter corner frequency.

9. The method for performing power conversion of claim 7, further comprising a frequency spectrum of said filter including a switching component of said converter switch wherein the attenuation of said switching component by said filter is determined in accordance with the relationship: Attenuation in dB=$12*\log2(F_{sw}/2F_{in})$ and $F_{sw}$ represents said converter switch frequency and 2Fin represents said filter corner frequency.

10. The method for performing power conversion of claim 1 comprising the step of providing said converter output AC waveform independently of performing AC/DC conversion.

11. The method for performing power conversion of claim 1, wherein said converter switch comprises a double pole switch.

12. The method for performing power conversion of claim 1, wherein said converter switch has a switch duty cycle comprising the further step of selecting said switch duty cycle in accordance with a conversion power division factor.

13. The method for performing power conversion of claim 1, comprising the further step of reflecting unused power determined by said input power level and said output power level.

* * * * *